(12) United States Patent
Pearson et al.

(10) Patent No.: US 8,914,358 B1
(45) Date of Patent: *Dec. 16, 2014

(54) SYSTEMS AND METHODS FOR IMPROVED SEARCHING

(71) Applicant: Google Inc., Mountain View, CA (US)

(72) Inventors: Mark Pearson, San Francisco, CA (US); Simon Tong, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/973,304

(22) Filed: Aug. 22, 2013

Related U.S. Application Data (63) Continuation of application No. 10/726,345, filed on Dec. 3, 2003, now Pat. No. 8,521,725.

(51) Int. Cl.
   *G06F 7/00* (2006.01)
   *G06F 17/30* (2006.01)

(52) U.S. Cl.
   CPC .................................. *G06F 17/3053* (2013.01)
   USPC ........................................................ 707/722

(58) Field of Classification Search
   None
   See application file for complete search history.

(56) References Cited

U.S. PATENT DOCUMENTS

| | | | |
|---|---|---|---|
| 5,920,854 A | 7/1999 | Kirsch et al. | |
| 5,963,932 A | 10/1999 | Jakobsson et al. | |
| 6,006,222 A | 12/1999 | Culliss | |
| 6,006,225 A * | 12/1999 | Bowman et al. | 1/1 |
| 6,014,665 A | 1/2000 | Culliss | |
| 6,078,916 A | 6/2000 | Culliss | |
| 6,169,986 B1 * | 1/2001 | Bowman et al. | 1/1 |
| 6,182,068 B1 | 1/2001 | Culliss | |
| 6,185,558 B1 * | 2/2001 | Bowman et al. | 705/37 |
| 6,185,559 B1 | 2/2001 | Brin et al. | |
| 6,275,820 B1 | 8/2001 | Navin-Chandra et al. | |
| 6,285,999 B1 | 9/2001 | Page | |
| 6,321,228 B1 | 11/2001 | Crandall et al. | |
| 6,353,849 B1 | 3/2002 | Linsk | |
| 6,366,934 B1 | 4/2002 | Cheng et al. | |
| 6,424,980 B1 | 7/2002 | Iizuka et al. | |
| 6,526,440 B1 | 2/2003 | Bharat | |
| 6,529,903 B2 | 3/2003 | Smith et al. | |
| 6,539,377 B1 | 3/2003 | Culliss | |

(Continued)

FOREIGN PATENT DOCUMENTS

| | | |
|---|---|---|
| WO | 0077689 | 12/2000 |
| WO | 0167297 | 9/2001 |

OTHER PUBLICATIONS

Boyan, J. et al, "A Machine Learning Architecture for Optimizing Web Search Engines," School of Computer Science, Carnegie Mellon University, May 10, 1996, pp. 1-8.

(Continued)

*Primary Examiner* — Robert Beausoliel, Jr.
*Assistant Examiner* — Michael Pham
(74) *Attorney, Agent, or Firm* — Middleton Reutlinger (57) ABSTRACT

Methods and systems for improved searching are described. In one of the described methods, a user enters a search query, and in response, a search engine receives a substantially complete initial search result set having a plurality of ranked article identifiers. The search engine automatically selects at least one of the article identifiers and provides a final result set in which the selected article identifier is ranked higher than in the initial search result set.

23 Claims, 4 Drawing Sheets

(56) References Cited

U.S. PATENT DOCUMENTS

| | | | |
|---|---|---|---|
| 6,564,213 B1 | 5/2003 | Ortega et al. | |
| 6,567,103 B1 | 5/2003 | Chaudhry | |
| 6,615,209 B1 | 9/2003 | Gomes et al. | |
| 6,658,423 B1 | 12/2003 | Pugh et al. | |
| 6,678,681 B1 | 1/2004 | Brin | |
| 6,684,204 B1 | 1/2004 | Lal | |
| 6,725,259 B1 | 4/2004 | Bharat | |
| 6,728,704 B2 | 4/2004 | Mao et al. | |
| 6,732,086 B2 | 5/2004 | Plow et al. | |
| 6,732,087 B1 | 5/2004 | Hughes et al. | |
| 6,738,764 B2 | 5/2004 | Mao et al. | |
| 6,745,178 B1 | 6/2004 | Emens et al. | |
| 6,754,873 B1 | 6/2004 | Law et al. | |
| 6,826,559 B1 | 11/2004 | Ponte | |
| 6,832,218 B1 | 12/2004 | Emens et al. | |
| 6,847,972 B1 | 1/2005 | Vernau et al. | |
| 6,853,993 B2 | 2/2005 | Ortega et al. | |
| 6,873,982 B1 | 3/2005 | Bates et al. | |
| 6,877,002 B2 | 4/2005 | Prince | |
| 6,990,453 B2 | 1/2006 | Wang et al. | |
| 7,051,014 B2 | 5/2006 | Brill et al. | |
| 7,058,624 B2 | 6/2006 | Masters | |
| 7,152,057 B2 * | 12/2006 | Brill et al. | 1/1 |
| 7,152,061 B2 | 12/2006 | Curtis et al. | |
| 7,165,080 B2 | 1/2007 | Kotcheff et al. | |
| 7,206,780 B2 | 4/2007 | Slackman | |
| 7,277,928 B2 | 10/2007 | Lennon | |
| 7,574,426 B1 | 8/2009 | Ortega | |
| 7,689,615 B2 | 3/2010 | Burges et al. | |
| 7,756,857 B2 | 7/2010 | Wan | |
| 2002/0042791 A1 | 4/2002 | Smith et al. | |
| 2002/0049752 A1 | 4/2002 | Bowman et al. | |
| 2002/0069190 A1 | 6/2002 | Geiselhart | |
| 2002/0078020 A1 | 6/2002 | Lawton | |
| 2002/0123988 A1 | 9/2002 | Dean et al. | |
| 2002/0129014 A1 | 9/2002 | Kim et al. | |
| 2002/0133481 A1 | 9/2002 | Smith et al. | |
| 2002/0169754 A1 | 11/2002 | Mao et al. | |
| 2002/0194166 A1 * | 12/2002 | Fowler | 707/3 |
| 2003/0028890 A1 | 2/2003 | Swart et al. | |
| 2003/0033298 A1 | 2/2003 | Sundaresan | |
| 2003/0037074 A1 | 2/2003 | Dwork et al. | |
| 2003/0078914 A1 | 4/2003 | Witbrock | |
| 2003/0120654 A1 | 6/2003 | Edlund et al. | |
| 2003/0149686 A1 | 8/2003 | Drissi et al. | |
| 2003/0229640 A1 | 12/2003 | Carlson et al. | |
| 2004/0024739 A1 | 2/2004 | Copperman et al. | |
| 2004/0059708 A1 | 3/2004 | Dean et al. | |
| 2004/0059731 A1 | 3/2004 | Yianilos et al. | |
| 2004/0064447 A1 | 4/2004 | Simske et al. | |
| 2004/0068486 A1 * | 4/2004 | Chidlovskii | 707/3 |
| 2004/0103087 A1 | 5/2004 | Mukherjee et al. | |
| 2004/0119740 A1 | 6/2004 | Chang et al. | |
| 2004/0122811 A1 | 6/2004 | Page | |
| 2004/0153472 A1 | 8/2004 | Rieffanaugh | |
| 2004/0186828 A1 | 9/2004 | Yadav et al. | |
| 2004/0215607 A1 | 10/2004 | Travis | |
| 2005/0027670 A1 | 2/2005 | Petropoulos | |
| 2005/0027687 A1 | 2/2005 | Nowitz et al. | |
| 2005/0027691 A1 | 2/2005 | Brin et al. | |
| 2005/0033803 A1 | 2/2005 | Vleet et al. | |
| 2005/0044070 A1 | 2/2005 | Nagata et al. | |
| 2005/0050014 A1 | 3/2005 | Gosse et al. | |
| 2005/0060311 A1 | 3/2005 | Tong et al. | |
| 2005/0071465 A1 | 3/2005 | Zeng et al. | |
| 2006/0218114 A1 | 9/2006 | Weare et al. | |
| 2006/0224554 A1 | 10/2006 | Bailey et al. | |
| 2006/0230022 A1 | 10/2006 | Bailey et al. | |
| 2006/0294071 A1 | 12/2006 | Weare et al. | |
| 2006/0294086 A1 | 12/2006 | Rose et al. | |
| 2007/0011154 A1 | 1/2007 | Musgrove et al. | |
| 2007/0088692 A1 | 4/2007 | Dean et al. | |
| 2008/0313017 A1 | 12/2008 | Totten | |
| 2010/0114933 A1 * | 5/2010 | Murdock et al. | 707/765 |
| 2012/0095837 A1 * | 4/2012 | Bharat et al. | 705/14.54 |

OTHER PUBLICATIONS

Sahami, M. et al, T.D. 2006, A web-based kernel function for measuring the similarity of short text snippets, In Proceedings of the 15th International Conference on World Wide Web (Edinburgh, Scotland, May 23-26, 2006). WWW '06. ACM Press, New York, NY, pp. 377-386.

Baeza-Yates, Ricardo et al, "The Intention Behind Web Queries." SPIRE, 2006, pp. 98-109.

Smith, et al, "Leveraging the Structure of the Semantic Web to enhance information retrieval for proteomics," vol. 23, Oct. 7, 2007, 7 pages.

Brin, S. and L. Page, "The Anatomy of a Large-Scale Hypertextual Web Search Engine," Computer Science Department, 1998.

* cited by examiner

SYSTEMS AND METHODS FOR IMPROVED SEARCHING

CROSS-REFERENCE TO RELATED APPLICATIONS

This application is a continuation under 35 U.S.C. §120 of U.S. patent application Ser. No. 10/726,345, filed Dec. 3, 2003 and entitled "Systems and Methods for Improved Searching", which is hereby incorporated by reference in its entirety.

FIELD OF THE INVENTION

The present invention relates generally to methods and systems for searching. The present invention relates particularly to methods and systems for improved searching.

BACKGROUND

A conventional search engine, such as the Google™ search engine, returns a result set in response to a search query submitted by a user. The search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures. For example, the search engine may rank the results based on a popularity score. The search engine generally places the most popular results at the beginning of the result set.

Unfortunately, many links that the user is not likely to see may be of interest to the user. For example, a user may enter a very broad search term that results in a large number of documents returned by the search engine. The user may examine, for example, the first ten, twenty, or thirty documents, but may be unlikely to examine results occurring after some point in the result set. For this reason, the user is unlikely to ever see a result that appears after a certain point in a result set even though the result may be the most or one of the most useful or relevant for the particular user submitting the search query.

The desired web site may not appear highly ranked in the results due to a variety of factors, such as a poor ranking function or poor or unclear queries entered by the user. For example, the user may enter a query that is unclear, that does not use "good" search terms, or that the search engine has difficulty interpreting and finding results for. Spelling errors are one example of why a search engine may not return the desired result highly ranked in the result set.

Often, when a user does not see results they want, they are able to reformulate the query such as by using a different term to find the web site for which they are searching and do so in a subsequent query. The user may replace a term in the search query with a "good" search term or may, for example, correct the spelling of a term in a subsequent search query. Conventional search engines are unable to relate multiple queries in a way that addresses the problem set out above in an effective manner.

Thus, a need exists for systems and methods for improved searching.

SUMMARY

Embodiments of the present invention provide systems and methods for improved searching. In one embodiment of the present invention, a user enters a search query, and in response, a search engine locates and ranks relevant documents. The search engine then relocates an article that is in a first position in the result set based on the initial ranking to a second position in the result set. The first position is a position not likely to be seen by the user, and the second position is a position that is likely to be seen by a user. The search engine may identify the article in various ways. For example, in one embodiment, the search engine randomly selects the article for relocation.

In another embodiment of the present invention, the search engine receives a first result set in response to a first search query and a second, candidate result set in response to a second search query. The search engine identifies an article in the candidate result set and inserts the article into the first result set. The queries may be related in various ways. For example, the second query may be a reformulated version of the first query.

Further details and advantages of embodiments of the present invention are set forth below.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Figure 1:
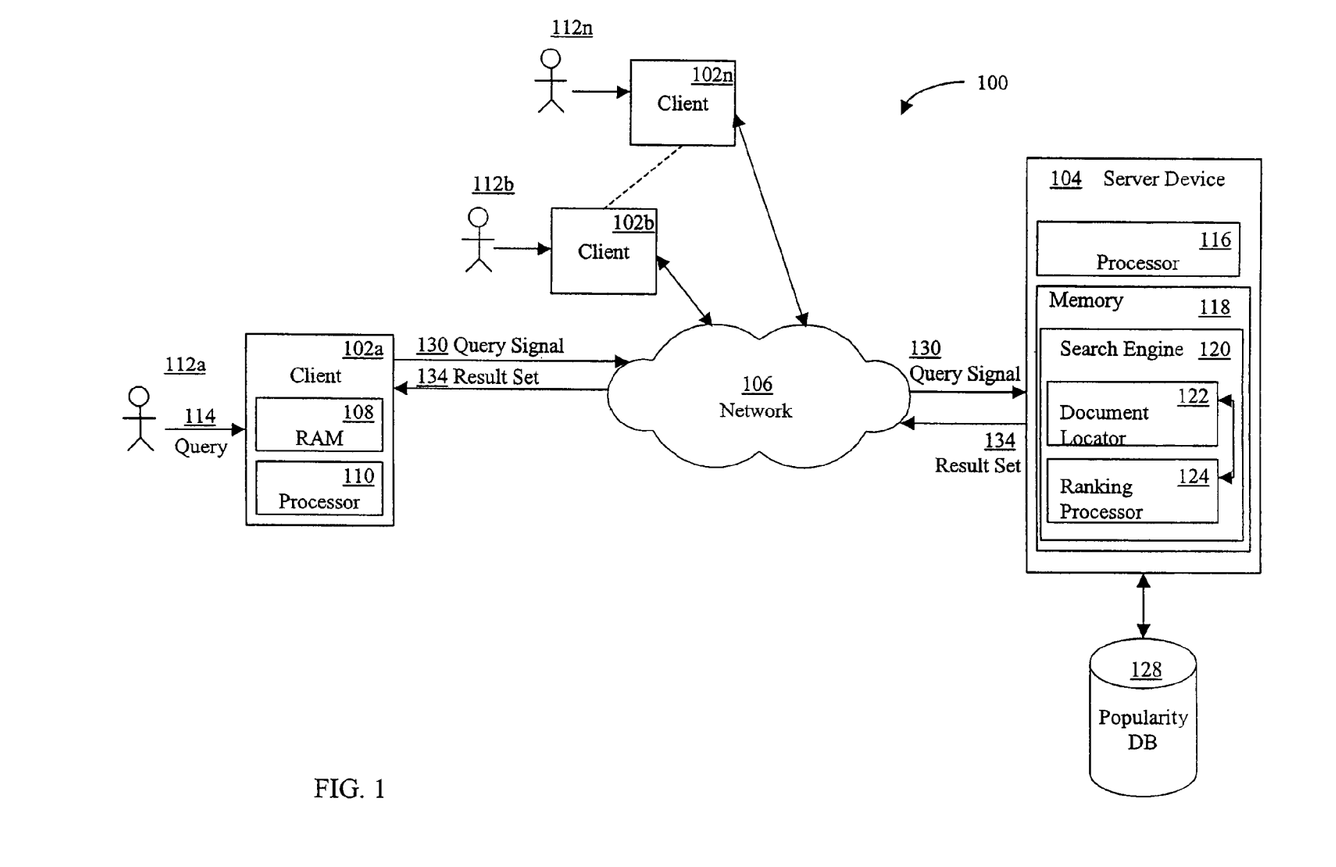
FIG. 1 is a block diagram illustrating an exemplary environment in which one embodiment of the present invention may operate.

Embodiments of the present invention comprise methods and systems for improved searching. Referring now to the drawings in which like numerals indicate like elements throughout the several figures, FIG. 1 is a block diagram illustrating an exemplary environment for implementation of one embodiment of the present invention. The system 100 shown in FIG. 1 includes multiple client devices 102a-n in communication with a server device 104 over a network 106. The network 106 shown includes the Internet. In other embodiments, other wired and wireless networks, such as an intranet may be used. Moreover, methods according to the present invention may operate within a single computer.

The client devices 102a-n shown each includes a computer-readable medium, such as a random access memory (RAM) 108 coupled to a processor 110. The processor 110 executes computer-executable program instructions stored in memory 108 as program code. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Internet Explorer™ from Microsoft Corporation, Netscape Navigator™ from Netscape Communications Corporation, and Safari™ from Apple Computer, Inc.

Through the client devices 102a-n, users 112a-n can communicate over the network 106 with each other and with other systems and devices coupled to the network 106. As shown in FIG. 1, a server device 104 is also coupled to the network 106. In the embodiment shown, a user 112a-n generates a search query 114 at a client device 102a. The client device 102a transmits the query 114 the server device 104 via the network 106. For example, a user 112a types a textual search query into a query field of a web page of a search engine interface displayed on the client device 102a, which is then transmitted via the network 106 to the server device 104. In the embodiment shown, a user 112a inputs a search query 114 at a client device 102a, which transmits a search query signal 130 associated with the search query 114 to the server device 104. The search query 114 may be transmitted directly to the server device 104 as shown. In another embodiment, the query signal 130 is instead sent to a proxy server (not shown), which then transmits the query signal 130 to server device 104. Other configurations are possible.

The server device 104 shown includes a server executing a search engine application program, such as the Google™ search engine. Similar to the client devices 102a-n, the server device 104 shown includes a processor 116 coupled to a computer-readable memory 118. Server device 104, depicted as a single computer system, may be implemented as a network or cluster of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates relevant information in response to a search query 114 from a user 112a-n. The search engine 120 then provides the result set 134 to the client 102a via the network 106. The result set 134 comprises one or more article identifiers. An article identifier may be, for example, a uniform resource locator (URL), a file name, a link, an icon, a path for a local file, or anything else that identifies an article. In the embodiment shown, an article identifier comprises a URL associated with an article.

In the embodiment shown, the server device 104, or related device, has previously performed a crawl of the network 106 to locate articles, such as web pages, stored at other devices or systems connected to the network 106, and indexed the articles in memory 118 or on another data storage device. Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image.

The search engine 120 includes a document locator 122, and a ranking processor 124. In the embodiment shown, each comprises computer code residing in the memory 118. The document locator 122 identifies a set of documents that are responsive to the search query 114 from a user 112a by, for example, accessing an index of documents, indexed in accordance with potential search queries or search terms.

In one embodiment of the present invention, the search engine 120 may also search a database (not shown) containing articles that have been previously identified as being relevant to a particular query. In yet another embodiment, the search engine 120 searches a file system of a local or remote machine to locate articles relevant to the first search query and of potential interest to the user 112a.

In the embodiment shown, the ranking processor 124 ranks or scores the search result 134 including the located set of web pages or documents based upon relevance to the search query 114 or another criteria, such as a popularity score. Note that other functions and characteristics of the document locator 122 and ranking processor 124 are further described below.

Server device 104 also provides access to other storage elements, such as a popularity database 128. The server device 104 can access other similar types of data storage devices. The popularity database 128 stores measures of the popularity of a document. The popularity database 128 may contain either or both query-dependent and query-independent popularity measures. For example, the popularity database 128 may store the number of times a particular document has been shown to users—a query-independent measure. Alternatively or additionally, the popularity database 128 may store the number of times that the article has been shown to a user in response to a particular keyword—a query-dependent measure. The ranking processor 124 utilizes this information in performing rankings of pages in the result set 134. When the search engine 120 generates a result set 134, the search engine 120 causes a record to be added or modified in the popularity database 128 to indicate that a particular result was shown to a user 112a in a result set 134.

Other measures of popularity may be stored in the popularity database 128, including, for example, click-through data. Click-through data is generally an indicator of quality in a search result. Quality signals or click-through data can include, but is not limited to, whether a particular URL or document is clicked by a particular user; how often a URL, document, or web page is clicked by one or more users; how often a particular user clicks on specific documents or web pages; and the ratio of how often a URL, document, or web page is clicked by one or more users to the number of times the URL, document or web page is shown to one or more users (known also as the click-through ratio). A popularity database 128 or similar data storage devices can store other types of quality signals similar to click-through data, such as user inputs or observational type data.

Other data related to documents located in a search result 134 that can be stored in a popularity database 128 or other data storage device can include, but is not limited to, how often a particular URL, document, or web page is shown in response to a search query 114; how many times a particular search query 114 is asked by users 112; the age or time a particular document has been posted on a network 106, and the identity of a source of a particular document on a network 106.

It should be noted that embodiments of the present invention may comprise systems having different architecture than that which is shown in FIG. 1. For example, in some systems according to the present invention, server device 104 may comprise multiple physical servers. Also, the server 104 and client 102a may be the same machine, or server functions may instead be performed by the client 102a, or client functions may instead be performed by the server 104. The system 100 shown in FIG. 1 is merely exemplary, and is used to explain the exemplary methods shown in FIGS. 2 and 3.

Various methods may be implemented in the environment shown in FIG. 1 and other environments according to the present invention. For example in one embodiment, a user 112a enters a search query 114. The client 102a generates a query signal 130, comprising the search query 114, and transmits the search query 130 to the server device 104 via the network 106. In response, to receiving the associated query signal 130, a search engine 120 locates documents and returns article identifiers associated with the documents in a result set 134. Before returning the result set 134, the search engine 120 ranks the results. The search engine 120 may use a popularity measure or other signal to influence the ranking of the search results. The search engine 120 may use the signals alone or in combination.

Each document occupies a position in the search result 120. For example, the most highly-ranked document in the result set 134 occupies position one. The search engine 120 then relocates an article in a first position in the result set 134 based on the initial ranking to a second position in the result set 134. The first position is a position not likely to be seen by the user 112a. The second position is a position that is likely to be seen by a user. In one embodiment, the search engine 120 relocates the article only after receiving a substantially complete result set. In one such embodiment, a substantially complete result set may comprise a plurality of article identifiers (e.g., two or more) that represents a set or sub-set of a result set that may be operated upon to provide a final result set in which at least one of the article identifiers is ranked differently in the final result set than in the substantially complete result set. In one example of such an embodiment, a substantially complete result set comprises articles that are likely to be seen and articles that are unlikely to be seen by the user if provided as a final result set.

Search engines typically provide result sets of multiple article indicators. These result sets may be provided in, for example, one web page or multiple web pages. Typically, results after a particular number of article identifiers (e.g., 10, 20, or 30) are unlikely to be seen or viewed by the recipient of the search results. For example, a recipient may likely only page and/or scroll through the first 20 results (e.g., relevant article indicators) of a result set before trying another search, clicking through and becoming engaged with a web site associated with one of the viewed results, or carrying out some other activity. In such an example, if two thousand results are returned in a result set, twenty of such results may be likely to be viewed by the recipient and one thousand nine hundred and eighty may be unlikely to be viewed by the recipient. The number of results that a recipient is likely or unlikely to see depends on the context, and will vary depending on context. Ten, twenty, and thirty results are used above merely as examples. Factors influencing such variation include, for example, the number of results shown on a page, the type of device on which the recipient views the results (e.g., personal computer or hand-held device), the font size, the relevancy of the results, and many other factors.

In another embodiment, the search engine 120 receives an initial web (i.e., Internet or intranet) search result set having a plurality of ranked article identifiers. The search engine automatically selects at least one of the plurality of ranked article identifiers, for example, by randomly selecting an article identifier not likely to be seen by the user 112a. The search engine then provides the final search result 134 to the client, wherein the at least one of the plurality of article identifiers is ranked higher than in the initial web search result set. The search engine may also cause the final search result set to be displayed.

The terms first and second are used here merely to differentiate one item from another item. The terms first and second are not used to indicate first or second in time, or first or second in a list, or other order, unless explicitly noted. For example, the "second" may come in time or in list before the "first," unless it is otherwise explicitly indicated.

The result set 134 may comprise tiers of various sizes, additional tiers, or may not comprise any tiers. The use of tiers is merely a convenient means of dividing the result set 134, separating results that are likely to be seen by a user 112a from those not likely to be seen by a user 112a.

In one embodiment, the first position in which the document is located is in a lower tier and the second position is in a higher tier. In one such embodiment, the higher tier comprises the first twenty articles in the result set 134 and the lower tier comprises the next fifty documents. In such an embodiment, a random number generator with a lower bound of twenty-one and an upper bound of seventy provides the location of the document to be relocated.

In an embodiment of the present invention, the search engine may identify the article in various ways. For example, in one embodiment, the search engine 134 randomly selects the article for relocation.

In another embodiment, the search engine 120 receives a first result set in response to a first search query, the result set ranked based on a ranking measure. The search engine 120 also receives a second, candidate result set in response to a second search query, the candidate result set is also sorted based on the ranking measure. The search engine 120 identifies an article in the candidate result set and inserts the article into the first result set. The first and second query may be substantially identical. For example, the search engine 120 may execute a first query for "infinity" and a second query for "infiniti."

For each search query 114 received from the user 112a, the search engine 120 receives a candidate result set comprising documents, which may be inserted into the result set 134 that is sent to the client 102a. The candidate result set may be obtained in numerous ways, including, for example, by examining some results that are shown in the result set of the first search query in a position that is not likely to be seen by the user 112a, from highly ranked results on query refinements, or from a database of hand-picked results. The candidate result set may be generated before the search query 114 is submitted and stored in a database. When the search query 114 is executed by the search engine 120, the search engine 120 searches the data store (not shown) for one or more relevant candidate result sets from which to select documents for placement in the result set 134 sent to the client 102a.

Pre-generating the candidate result set provides several advantages. For instance, if the candidate result set is pre-generated, the user 112a does not have to wait for the candidate result set to be generated. In addition, having a pre-generated candidate provides a control for what is inserted into the result set 134. For example, the result set 134 for a particular query may change. By using a pre-generated candidate result set, the URL's that are relocated can be controlled.

Also, using a pre-generated candidate result set expands the scope of the manner in which the candidates are identified and inserted, allows the search engine 120 to generate the list in a more efficient manner than would otherwise be possible, and provides the opportunity to normalize the process of insertion to insure that specific results inserted into the result set 134 for the various users submitting a particular query are shown a comparable number of times.

The search engine 120 can identify the second query in various ways. In one embodiment, the search engine 120 identifies the second search query as one related to the first search query temporally. For example, the search engine 120 may determine that users often enter the search query "infiniti" immediately or almost immediately after entering the search query "infinity." Such information is available in conventional log files generated by search engines. In one embodiment, the search engine 120 will determine that queries are related only if they are issued in close proximity numerous times. For example, in one embodiment, the search engine 120 determines that a search for "infinity" and "infiniti" are related after they are found in close temporal proximity five or more times. In another similar embodiment, the search engine 120 identifies particular articles that have been navigated to after submitting the first search query and inserts the URL for those articles in the result set 134. The user 112a may never have clicked on the article in a result set 134. However, the article to which the user 112a navigated and the search query may be related in some manner, e.g., temporally. For example, if users often navigate to www.infiniti.com after entering a search query that includes the term "infiniti" or "infinity," the search engine 120 inserts the URL www.infiniti.com in the result set for the search queries "infiniti" and "infinity."

In one such embodiment, the search engine 120 identifies the article as one appearing in a first tier of the candidate result set. The first tier comprises the set of documents that are likely to be viewed by the user 112a, e.g., the first twenty documents. In other words, the search engine 120 finds a second search query that is likely to be relevant to the first query and then locates documents that are highly ranked in the result set from the second query. In this way, the search engine 120 is able to identify potentially relevant documents that may not be highly ranked, and thus viewed, in the result set generated by the search engine 120 in response to receiving the first search query.

In another embodiment, the search engine 120 associates the first search query with a user identifier by, for example, searching the client 102a for a cookie or by retrieving the IP address of the client 102a. The search engine 120 then searches a data store (not shown) for a previously submitted query associated with the same user. The search engine 120 then executes the previously submitted query as the second query, retrieves a document from the result set of the second query and inserts the document into the result set from the first query. Various other measures may be used to determine that two queries by the same user 112a are related. For example, in one embodiment, two queries by the same user must include at least one shared or overlapping term before the search engine 120 identifies them as related. In another embodiment, two queries by different users are determined to be related because the queries include at least one shared term.

In yet another embodiment, the search engine 120 generates the second search query by reformulating the first search query. Reformulation may take various forms. In one embodiment, the search engine 120 replaces a first term in the search query with a second term. The second term may be, for example, a synonym of the first term. In another embodiment, the search engine 120 reformulates the query by removing a term. In yet another embodiment, the search engine 120 reformulates the query by adding an additional term.

In another embodiment, particular URL's are manually associated with a search query. The search engine 120 retrieves these "hand-picked" URL's to create the candidate result set. When the user 112a submits the search query, the search engine inserts the hand-picked URL into the result set 134. In yet another embodiment, the search engine 120 ranks the results in the first result set or, alternatively, in a second result set using an alternative ranking scheme to create the candidate result set. The search engine 120 then identifies articles in the candidate result set to insert into the result set 134.

Figure 2:
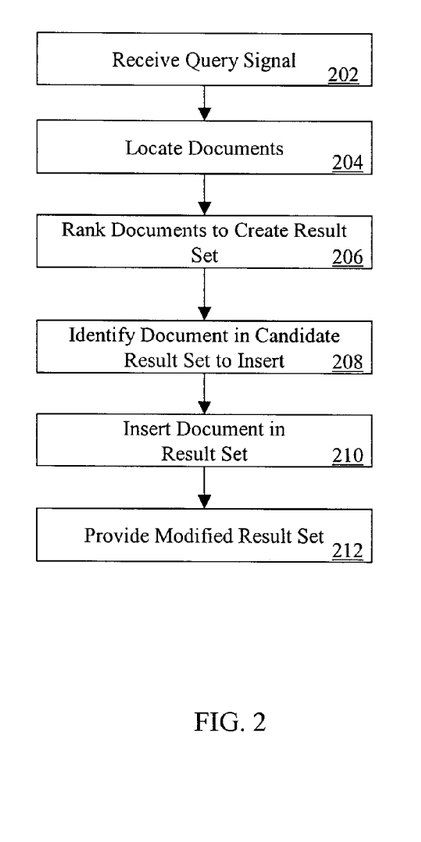
FIG. 2 is a flowchart illustrating a process for relocating a document in a result set in one embodiment of the present invention.

FIG. 2 is a flowchart illustrating a process for relocating a document in a result set in one embodiment of the present invention. In the embodiment shown, the server device 104 receives a query signal (130) 202. In response, the server device 104 uses the document locator 122 of the search engine 120 to locate documents corresponding to the query signal (130) 204. The ranking processor 124 then ranks the located documents to create a result set (134) 206.

Once the result set 134 has been created, the search engine 120 identifies a document in a candidate result set that may be of interest to the user 112a but that is not likely to be shown to the user 208. The search engine 120 may identify such a document in a number of ways as set forth herein. In one embodiment, the candidate result set comprises a section of the result set returned in response to the search query. In another embodiment, the search engine 120 retrieves the candidate result set from a data store (not shown). Data indicating actual popularity of the page can later be used to rank the relocated document in a conventional manner. Each user 112a is provided with a different random URL or set of URL's. In one embodiment, some URL's are identified as being potentially more relevant to the user or the user's query. In one such embodiment, although the URL's are chosen at random, the choice is biased towards the more potentially-relevant URL's. One goal of an embodiment of the present invention is to determine whether or not URL's that are not typically shown to a user 112a in response to a particular query are more relevant to the query than is evident using conventional ranking criteria.

The search engine 120 inserts the document in the result set 134 to a position that the user is likely to see 210. For example, the search engine 120 may relocate the document in the one-hundredth position in a result set 134 to the fifth position in the result set 134. The search engine 120 then provides the modified search result 134 to the client 102a by transmitting it over the network (106) 212.

Figure 3:
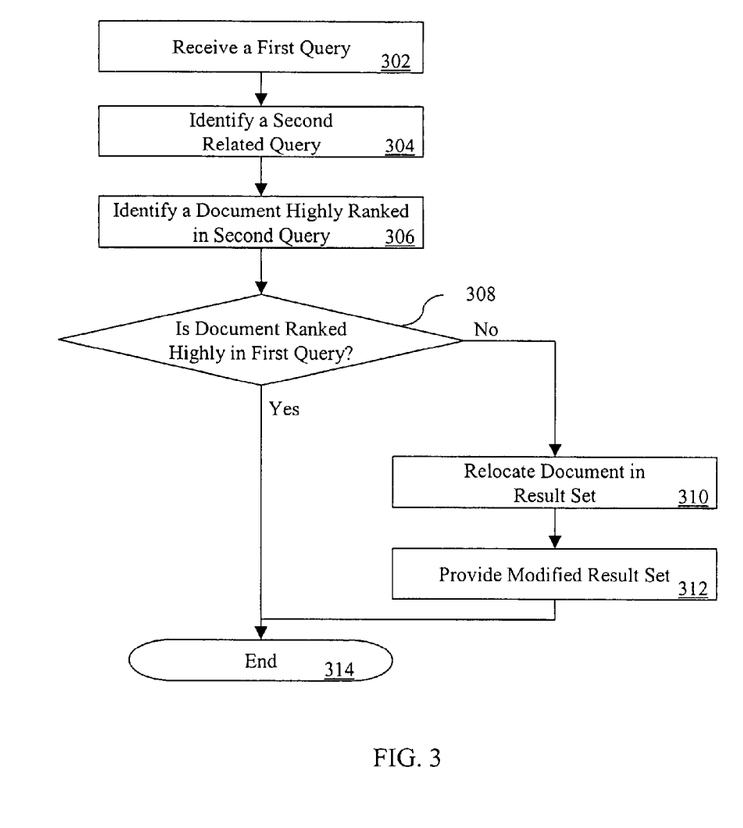
FIG. 3 is a flowchart illustrating a process for identifying a document to be relocated in one embodiment of the present invention.

FIG. 3 is a flowchart illustrating a process for identifying a document to be relocated in one embodiment of the present invention. In the embodiment shown, the search engine 120 receives a first search query 302. The search engine 120 then identifies a second related query 304. The search engine may use a variety of data elements to determine whether two queries are related. For example, in one embodiment, the search engine 120 searches previously submitted queries for queries that were submitted by the same user 112a. In another embodiment, the search engine 120 searches previously submitted queries submitted by the same user 112a within a predetermined amount of time, for example, five minutes. Queries submitted by the same user 112a, particularly those submitted relatively recently, are likely to be related to the current query. The relation between queries may be stored in a dedicated data store or may be determined by evaluating the log files created by the server device 104 in response to actions by the user 112a. The queries may be related temporally and because they share the same terms. Other measures or factors may be utilized to relate queries to one another.

The search engine 120 compares the result set of the related query to the original query by first identifying a highly ranked document in the result set from the related query 306. The search engine 120 may search a database for previously retrieved results from the related query or may execute the related query to retrieve the results. Although searching previously retrieved results may offer advantages, such as quicker response time, executing the related query during the process of identifying relevant documents to relocate may be preferred in that it can help to ensure that the results are as timely as possible. The query results in a list of documents satisfying the query and ranked in order of relevance. The search engine 120 then determines whether or not the document is highly ranked in the first query 308. If the document is not highly ranked in the first query, the search engine 120 relocates the document to a position in which the user 112a is likely to view it 310. The search engine 120 then provides the modified result set 134 to the client (102a) 312. The process then ends 314. If at step 308, the search engine 120 determines that the document is highly ranked in the query results for the first search query, there is no reason to relocate the document, and the process ends 314. Steps 306 through 312 may be repeated for each of the documents in the result set for the related query or for a subset comprising more than one document. In addition, steps 304 through 312 may be repeated for each query that is related to the search query 114 submitted by the user 112a.

For example, a user 112a may enter the search query 114 "infinity" in an attempt to find a site related to the Infiniti™ brand of automobiles. In response, the search engine 120 returns a result set 134. The user 112a examines the result set 134 and determines that the web site that the user 112a was trying to find is not in the first several pages of the result set 134. Further, the user 112a determines that the query 114 that the user 112a should have submitted was "infiniti." The user 112a corrects the query 114 and submits the query 114 to the search engine 120. The search engine 120 returns the result set 134 for "infiniti." The web site for Inifiniti™ automobiles appears first, and the user 112a navigates directly to the www.infiniti.com web site.

Subsequently, when a second user 112a enters the query "infinity," the search engine 120 uses information from the first previously submitted queries to infer that "www.infiniti.com" may be relevant to the query "infinity." Accordingly, the search engine 120 relocates the result "www.infiniti.com" to a location that the user 112a is likely to see. If users 112a that are presented with "www.infiniti.com" in response to the query "infinity" often navigate to "www.infiniti.com," i.e., the document is a popular result to the query 114. As a result, in subsequent queries, the document may be highly ranked by a conventional ranking process. In other words, based on the popularity data gained by relocating the document, the search engine 120 will now determine that "www.infiniti.com" is a popular and highly relevant result for the query "infinity."

In an embodiment of the present invention, the search engine 120 relocates documents to provide the user 112a with the opportunity to view documents that otherwise would likely not be viewed. If the user 112a clicks on the document, the search engine 120 logs the click in the popularity database 128 as in a conventional process. In subsequent queries, the document will be ranked higher due to the popularity data stored in the popularity database 128. Accordingly, it may be unnecessary to rerank the document in response to subsequent queries.

In another embodiment, the search engine selects one or more documents at random that appear within a predetermined range in the result set 134 and relocates those documents. For example, in one such embodiment, the search engine 120 selects one or more documents occurring in pages five through ten of the result set 134. These documents are ranked highly enough relative to most pages in the result set 134 to be potentially of interest to the user 112a but are unlikely to be seen by the user 112a. In another embodiment, the search engine 120 selects one or more documents between results fifty and one hundred. The pages or results within which documents are located may be varied in different embodiments to determine the optimal range within which to select documents.

Figure 4:
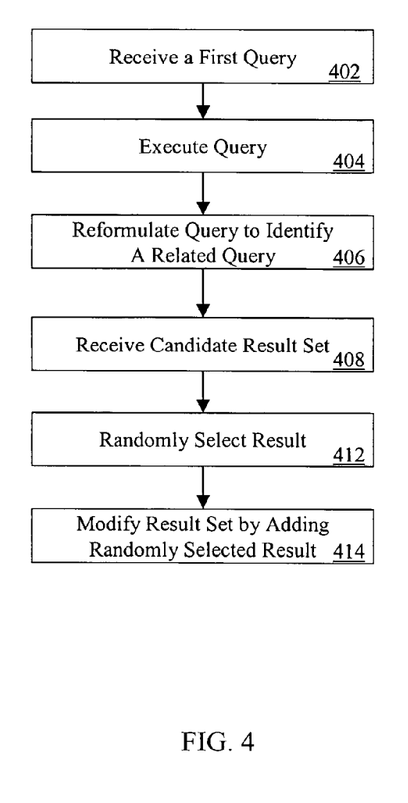
FIG. 4 is a flowchart illustrating another method of locating potentially relevant documents to be relocated in the result set in one embodiment of the present invention.

FIG. 4 is a flowchart illustrating another method of locating potentially relevant documents to be relocated in the result set in one embodiment of the present invention. In the embodiment shown, the search engine 120 receives a first query 402. The search engine executes the query 404, generating a result set 134. The search engine then reformulates the query to identify a related query 406.

The search engine may reformulate the query in numerous ways. In one embodiment, the search engine 120 reformulates the query by using variations of common words in the query. For example, if the query submitted is "cheap hotel," the search engine may reformulate the query by varying the term "cheap." In such an embodiment, one reformulation of the query may be "cheapest hotel." Other reformulations may be used. For example, the search engine 120 may use synonyms for words in the query to reformulate it. Other methods of reformulation may be used.

Referring still to FIG. 4, the search engine 120 searches a data store (not shown) for the related query and receives a candidate result set 408. The search engine 120 then randomly selects one or more results from the candidate result set of the related query for placement in the result set 134 to be transmitted to the client (112a) 412. The search engine 120 may repeat steps 406-412 repeatedly to identify additional related queries and documents. The search engine then modifies the result set 134 to be sent to the client (102a) 414.

In an embodiment of the present invention, the modified result set 134 should appear consistent to the user 112a during subsequent sessions in which the same query 114 is executed. This consistency is maintained over a relatively short period of time. During the relatively short period of time, the user 112a has an expectation that the result set 134 for a specific query 114 will remain consistent. However, the user 112a generally does not expect a result set 134 to remain consistent over an extended period, e.g., a week, due to the highly volatile nature of content on the Internet. The search engine 120 may accomplish consistency by storing a user identifier in a data store, such as a cookie, and using the user identifier to retrieve the search query, the URL of the result, and the position to which the result was relocated for a prescribed period of time. Other methods of maintaining consistency may also be used. In one embodiment, if an inserted document has been shown a set number of times, e.g., twenty, and does not appear to be a popular result to the query, the document is no longer inserted, i.e., the document is discarded as a potentially relevant result to the query.

The foregoing description of the preferred embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A computer-implemented method, comprising:
obtaining, in a server device, a plurality of first search results responsive to a first search query, the plurality of first search results being ranked in an order;
obtaining one or more second search results responsive to a second search query, the second search query being related to the first search query;
identifying a particular search result of the second search results;
determining that the particular search result is related to the first search query and that the particular search result is highly ranked for the second search query;
determining that the particular search result is not within a threshold number of highest-ranked first search results of the first search results responsive to the first search query;
in response to determining that the particular search result is highly ranked for the second search query and the particular search result is not within a threshold number of highest-ranked first search results of the first search results responsive to the first search query, modifying the first search results by providing the particular search result within the threshold number of highest-ranked first search results of the first search results responsive to the first search query; and
providing the modified plurality of first search results in response to the first search query.

2. The method of claim 1, further comprising:
determining the second search query is related to the first search query based on a temporal relationship between the first search query and the second search query.

3. The method of claim 2, wherein the temporal relationship is determined by analyzing log files.

4. The method of claim 1, further comprising:
determining the second search query is related to the first search query based on one or more shared terms between the first search query and the second search query.

5. The method of claim 1, further comprising:
generating the second search query by reformulating the first search query.

6. The method of claim 5, wherein reformulating the first search query includes at least one of replacing or removing a term in the first search query.

7. The method of claim 5, wherein reformulating the first search query includes adding a term to the first search query.

8. The method of claim 1, wherein determining that the particular search result is highly ranked for the second search query includes determining that the particular search result appears within a threshold number of highest-ranked second search results of the second search results responsive to the second search query.

9. The method of claim 8, wherein determining that the particular search result is related to the first search query includes determining that the particular search result is responsive to the first search query; and wherein modifying the first search results includes moving the particular search result from an original position in the order to an improved position that is within the threshold number of highest-ranked first search results.

10. The method of claim 9, wherein the original position of the particular search result is in a lower tier of the first search results and the second position is in a higher tier of the first search results.

11. The method of claim 1, further comprising:
determining, based on information received after providing the modified plurality of first search results, whether the particular search result has a higher relevance to the first search query than the relevance indicated by the original position.

12. A system comprising:
one or more data processing apparatus; and
a computer-readable storage device having stored thereon instructions that, when executed by the one or more data processing apparatus, cause the one or more data processing apparatus to perform operations comprising:
obtaining a plurality of first search results responsive to a first search query, the plurality of first search results being ranked in an order;
obtaining one or more second search results responsive to a second search query, the second search query being related to the first search query;
identifying a particular search result of the second search results;
determining that the particular search result is related to the first search query and that the particular search result is highly ranked for the second search query;
determining that the particular search result is not within a threshold number of highest-ranked first search results of the first search results responsive to the first search query;
in response to determining that the particular search result is highly ranked for the second search query and the particular search result is not within a threshold number of highest-ranked first search results of the first search results responsive to the first search query, modifying the first search results by providing the particular first search result within the threshold number of highest-ranked first search results of the first search results responsive to the first search query; and
providing the modified plurality of first search results in response to the first search query.

13. The system of claim 12, wherein the operations further comprise:
determining the second search query is related to the first search query based on a temporal relationship between the first search query and the second search query.

14. The system of claim 13, wherein the temporal relationship is determined by analyzing log files.

15. The system of claim 12, wherein the operations further comprise:
determining the second search query is related to the first search query based on one or more shared terms between the first search query and the second search query.

16. The system of claim 12, wherein the operations further comprise:
  generating the second search query by reformulating the first search query.

17. The system of claim 16, wherein reformulating the first search query includes at least one of replacing or removing a term in the first search query.

18. The system of claim 16, wherein reformulating the first search query includes adding a term to the first search query.

19. The system of claim 12, wherein determining that the particular search result is highly ranked for the second search query includes determining that the particular search result appears within a threshold number of highest-ranked second search results of the second search results responsive to the second search query.

20. The system of claim 19, wherein determining that the particular search result is related to the first search query includes determining that the particular search result is responsive to the first search query; and wherein modifying the first search results includes moving the particular search result from an original position in the order to an improved position that is within the threshold number of highest-ranked first search results.

21. The system of claim 20, wherein the original position of the particular search result is in a lower tier of the first search results and the second position is in a higher tier of the first search results.

22. The system of claim 12, wherein the operations further comprise:
  determining, based on information received after providing the modified plurality of first search results, whether the particular search result has a higher relevance to the first search query than the relevance indicated by the original position.

23. A computer program product, encoded on one or more non-transitory computer storage media, comprising instructions that when executed by data processing apparatus cause the data processing apparatus to perform operations comprising:
  obtaining a plurality of first search results responsive to a first search query, the plurality of first search results being ranked in an order;
  obtaining one or more second search results responsive to a second search query, the second search query being related to the first search query;
  identifying a particular search result of the second search results;
  determining that the particular search result is related to the first search query and that the particular search result is highly ranked for the second search query;
  determining that the particular search result is not within a threshold number of highest-ranked first search results of the first search results responsive to the first search query;
  in response to determining that the particular search result is highly ranked for the second search query and the particular search result is not within a threshold number of highest-ranked first search results of the first search results responsive to the first search query, modifying the first search results by providing the particular first search result within the threshold number of highest-ranked first search results of the first search results responsive to the first search query; and
  providing the modified plurality of first search results in response to the first search query.

\* \* \* \* \*